US012348636B2

(12) United States Patent
Schrum

(10) Patent No.: US 12,348,636 B2
(45) Date of Patent: Jul. 1, 2025

(54) MANAGING COMPOSITE TOKENS FOR CONTENT ACCESS REQUESTS

(71) Applicant: Oracle International Corporation, Redwood Shores, CA (US)

(72) Inventor: Allan George Schrum, Wilsall, MT (US)

(73) Assignee: Oracle International Corporation, Redwood Shores, CA (US)

( * ) Notice: Subject to any disclaimer, the term of this patent is extended or adjusted under 35 U.S.C. 154(b) by 479 days.

(21) Appl. No.: 17/939,602

(22) Filed: Sep. 7, 2022

(65) Prior Publication Data

US 2024/0080195 A1    Mar. 7, 2024

(51) Int. Cl.
| | |
|---|---|
| *H04L 9/40* | (2022.01) |
| *G06F 21/60* | (2013.01) |
| *G06F 21/62* | (2013.01) |
| *H04L 9/08* | (2006.01) |
| *H04L 9/32* | (2006.01) |

(52) U.S. Cl.
CPC .......... *H04L 9/3213* (2013.01); *G06F 21/602* (2013.01); *G06F 21/62* (2013.01); *H04L 9/088* (2013.01)

(58) Field of Classification Search
CPC ..... H04L 9/088; H04L 9/3213; G06F 21/602; G06F 21/62
See application file for complete search history.

(56) References Cited

U.S. PATENT DOCUMENTS

| | | | |
|---|---|---|---|
| 8,051,491 B1* | 11/2011 | Cavage | H04L 63/0227 726/16 |
| 2009/0097661 A1* | 4/2009 | Orsini | G06F 21/45 380/279 |
| 2012/0054847 A1* | 3/2012 | Schultz | H04L 9/3213 726/9 |
| 2014/0115724 A1* | 4/2014 | van Brandenburg | H04L 63/0807 726/30 |
| 2015/0113172 A1* | 4/2015 | Johnson | H04L 67/75 709/245 |

(Continued)

OTHER PUBLICATIONS

"The Best Way to Securely Manage User Sessions", Jun. 8, 2019, 10 Pages.

(Continued)

*Primary Examiner* — William S Powers
(74) *Attorney, Agent, or Firm* — Invoke

(57) ABSTRACT

Techniques for managing composite tokens for content access requests are disclosed. A system provides a client device with a composite token to allow the client device to make subsequent requests to access content of a content provider without requiring re-authentication of the client device with each request. The composite token includes an access segment associated with permissions to access content. The composite token further includes a regeneration segment associated with permissions to invalidate the composite token and create a new composite token associated with a same user or session. The system invalidates a previous composite token and regenerates a new composite token if the access segment expires. The system requires re-authentication if the regeneration segment expires or if a composite token is received that is not the most recently-generated composite token.

20 Claims, 8 Drawing Sheets

(56) References Cited

U.S. PATENT DOCUMENTS

2016/0314460 A1* 10/2016 Subramanian ..... G06Q 20/4014
2021/0105263 A1* 4/2021 Suzuki ................ H04L 63/0853

OTHER PUBLICATIONS

"TLP-interest—Discussion of Proposed Revisions to the Trust Legal Provisions", retrieved from: https://www.ietf.org/mailman/listinfo/tlp-interest, retreived on: Sep. 2022, 2 pages.
"Trust Legal Provisions (TLP)", Dec. 2005, 3 Pages.
Daigle et al., "RFC Streams, Headers, and Boilerplates", Internet Architecture board, Dec. 2009, pp. 16.
Lodderstedt et al., "OAuth 2.0 Threat Model and Security Considerations", Internet engineering task force, Jan. 2013, 71 Pages.

* cited by examiner

MANAGING COMPOSITE TOKENS FOR CONTENT ACCESS REQUESTS

TECHNICAL FIELD

The present disclosure relates to managing composite tokens for content access requests. In particular, the present disclosure relates to securing communications between electronic devices using a composite token including a resource-access segment and a regeneration segment.

BACKGROUND

Various methods exist for managing security when devices communicate with each other electronically. Session-based methods provide a client device with a cookie which includes a session identifier (ID). Each time the client device sends a request to access a service on a target device, the target device checks the session ID in system memory, such as a database, to obtain session information. The target device provides access to services based on the session characteristics and the present state of the session. Token-based methods provide a client device with a token signed by a target device. The token may include information about a state of the target device. When the client device requests a service from the target device, the client device includes the token. The target device verifies that the token is valid and allows the client device to access services associated with the token.

A commonly-used token is the Java Web Token (JWT). The JWT provides specific information about what systems can be accessed and for what duration that access is permitted. However, the JWT provides no protection from theft. A bad actor that has stolen the token can use the JWT to the limits the token permits. One method of reducing fraudulent use of the JWT is to minimize the duration for which the JWT is valid. Upon expiration of the JWT, a user must provide authentication information, such as a username and password. A system may generate a new JWT to allow a user to continue accessing services from a target device. Thus, an unauthorized user would only be allowed to access the services for the lifetime of the token. Shortening the lifespan of the token reduces the amount of time an unauthorized user may fraudulently use the token. However, it also results in an inconvenience for an authorized user by requiring frequent logins to use a service for an extended period of time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
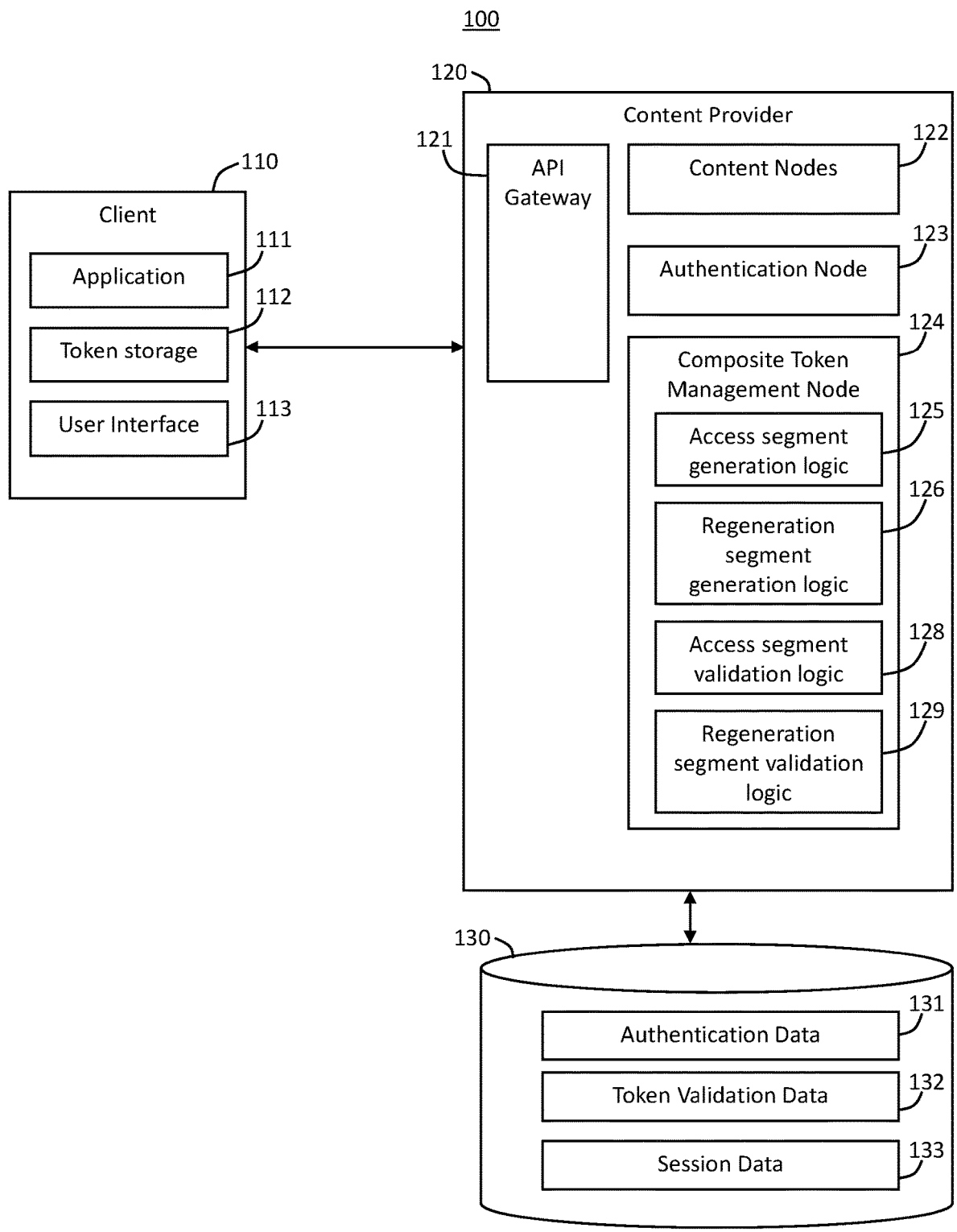
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MANAGING TOKENS FOR SECURE ELECTRONIC COMMUNICATIONS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A system uses a secure token to facilitate multiple interactions between a client device and content servers, without requiring a user to re-enter complete authentication information for each transaction. A secure token is generated in response to successful completion of an authentication process for authenticating a client device. The secure token may be transmitted to the client device for use in regaining access at a later time without completing the same authentication process (referred to as "full authentication").

One or more embodiments generate a secure composite token that includes multiple segments: an access segment and a regeneration segment. A system may grant a client device access to a resource upon successful validation of the access segment in the composite token. A system may generate a new composite token upon successful validation of the regeneration segment of the current composite token. As an example, the system may generate the new composite token upon successful validation of the regeneration segment of the current composite token when the access segment of the current composite token has expired. In some embodiments, the access segment of a composite token has a shorter lifespan than the regeneration segment of the same composite token.

The composite token may be security-protected to prevent manipulation by any devices, including the client device. For example, the composite token may be a JSON Web Token (JWT). The JWT may include a payload portion including the access segment and the regeneration segment. The payload portion may be encoded, but not encrypted. The JWT may further include a signature portion. The signature portion may be generated by (a) concatenating the payload and a header portion, and (b) encrypting the concatenated data. According to an alternative embodiment, the payload portion of the JWT may also be encrypted, preventing any client device from identifying information about the access segment and the regeneration segment.

In subsequent transactions between the client device and the content provider, the client device sends the initial composite token, or a subsequently-generated composite token, together with a request. The content provider deconstructs the composite token into the access segment and the regeneration segment. If the access segment has not expired, the system may grant the access request. If both the access segment and the regeneration segment have expired, the system requests from the client device authentication information, such as a username and password. If the access segment has expired, but the regeneration segment has not expired, and if the regeneration segment is the most recently-generated regeneration segment, the system invalidates the current regeneration segment. The system regenerates the composite token by generating a new access segment and a new regeneration segment. The system transmits the new composite token to the client device. The system also grants access to the content.

If an unauthorized user obtains a composite token, the unauthorized user may attempt to access content using the composite token. However, since the system regenerates the composite token with each request that occurs after expiration of the access segment (i.e., a relatively short time, such as one minute), the system will detect a request—either from the authorized user or the unauthorized user—made with a regeneration segment that is not the most recently-generated regeneration segment. In particular, the authorized user may obtain a regenerated composite segment based on a subsequent request. Alternatively, the unauthorized user may obtain a regenerated composite segment based on a subsequent request. When the system detects a request accompanied by an invalid regeneration segment, the system invalidates the current regeneration segment. Prior to granting further access, the system requires a client device to provide user- or application-generated authentication information, such as a username and a password.

One or more embodiments expose a single application programming interface (API) to perform backend operation, by a content provider, of (a) validating composite tokens, and (b) granting/denying access to content. For example, a client may generate a POST API call including an access request and a composite token. The client sends the POST API call to a content provider. An API gateway of the content provider transmits the composite token to an authentication server. Based on authentication, the authentication server may direct a content server to grant the client's request. The authentication server may further perform operations of (a) determining whether an access segment is expired, (b) determining whether a regeneration segment is expired and/or valid, and (c) regenerating a new composite token and transmitting the new composite token to the client.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a client 110 and a content provider 120. The client 110 runs an application 111, such as a web browser. The application 111 obtains content from the content provider 120. The client 110 may communicate with the content provider 120 via a network. For example, a user may enter or select a uniform resource locator (URL) via the application 111. The application 111 may generate a request to access content directed to an address associated with the content provider 120. The application 111 may generate the request using a hypertext transfer protocol (HTTP) or any other data transmission protocol.

In one or more embodiments, the client 110 is a tenant accessing shared resources of the content provider 120. A tenant is a corporation, organization, enterprise, or other entity that accesses a shared computing resource, such as content nodes 122.

In an embodiment, a client 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 113 refers to hardware and/or software configured to facilitate communications between a user and the client 110. Interface 113 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 113 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 113 is specified in one or more other languages, such as Java, C, or C++.

The content provider 120 may receive communications from external devices at an application programming interface (API) gateway 121. The API gateway 121 identifies a type of API function associated with the communication, and directs data packets to a corresponding node. The content provider 120 includes content nodes 122, an authentication node 123, and composite token management node 124. The content nodes 122 include servers storing content accessible by client devices. For example, a client device 110 may run applications on a virtual machine (VM) running on the content nodes 122. The VM may run on a server cluster. Communications between the client 110 and the content nodes 122 (e.g., the server cluster) may be managed by a cluster management server and/or a load balancer. The content nodes 122 may include a database node that receives queries, accesses a database in response to the queries, and returns database records in response to the queries. The content nodes 122 may include any data storage and computation servers that provide data content to client devices 110 in response to requests from client devices 110.

The authentication node 123 includes a server that receives authentication data from a client 110 and compares the received authentication data with stored authentication data 131 stored in a data repository 130 to determine access permissions associated with a request from the client 110. For example, the authentication data 131 may include usernames and passwords of users authorized to access content in the content nodes 122, permission levels associated with particular users (e.g., specifying what content, among the available content, a user is permitted to access, create, modify, and/or delete). In one or more embodiments, the system may associate a user ID in the authentication data 131 with particular token validation data 132, such as a current composite token ID or a current regeneration segment ID. In one or more embodiments, the system may associate a user ID in the authentication data 131 with particular session data 133, such as an active session associated with the user ID.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the content provider 120. Alternatively, or additionally, a data repository 130 may be implemented or executed on a computing system separate from the content provider. A data repository 130 may be communicatively coupled to the content provider 120 via a direct connection or via a network.

Information describing authentication data 131, token validation data 132, and session data 133 may be implemented across any of components within the system 100. However, this information is illustrated within the data repository 130 for purposes of clarity and explanation.

If the authentication node 123 determines that authentication data provided from a client device 110 is valid, the authentication node 123 may generate (a) instructions to one or more content nodes 122 to fulfill an access request from the client 110, and (b) instructions to the composite token management node 124 to generate a composite token. The composite token management node 124 generates a composite token which is provided to a client 110 upon authentication of the client. The composite token allows the client to perform subsequent interactions with the content nodes 122 without the need to re-send authentication data, such as a username and password, for each interaction. Instead, the client 110 transmits a composite token with each request. The content provider 120 executes the request or denies the request based on validating the composite token provided with the request.

The composite token management node 124 includes access segment generation logic 125 and regeneration segment generation logic 126. The composite token management node 124 generates a composite token including both an access segment and a regeneration segment. The access segment and the regeneration segment may be separate tokens that are stored within the composite token. Alternatively, the access segment and the regeneration segment may be separate segments—not complete tokens—stored within the composite token. For example, a token may include a header and a payload. Some tokens, such as JSON Web Tokens (JWT), may also include a signature. In one embodiment, the access segment and the regeneration segment each include a separate header and payload. In an alternative embodiment, access segment and the regeneration segment may not include separate headers. Instead, they may make up two segments of the payload of a composite token having one header and one signature. The access segment includes an identifier and an expiration value. The regeneration segment includes a separate identifier from the access segment and a separate expiration value. The expiration value represents a lifespan of the respective segment. In one or more embodiments, a lifespan of the regeneration segment is longer than that of the access segment. For example, the lifespan of the access segment may be 30 seconds, and the lifespan of the regeneration segment may be 5 minutes. According to one embodiment, the composite token management node 124 encrypts the access segment and the regeneration segment in the payload of the composite token. According to an alternative embodiment, the payload of the composite token remains unencrypted. Instead, the composite token management node 124 (a) concatenates the token header, the access segment, and the regeneration segment, (b) encrypts the concatenated data, and (c) includes the encrypted data as a signature of the composite token.

According to one or more embodiments, the composite token includes additional data, such as: (a) a user ID associated with a user initiating a content access request, (b) an content ID associated with content or applications corresponding to the request, (c) a permissions value indicating types or levels of content accessible using the token, (d) authentication data indicating whether the token was generated directly in response to the authentication node 123 authenticating a user, or whether the token was generated based on a token regeneration operation, and (e) a session ID corresponding to a session, or a series of one or more interactions between the application 111 and the content nodes 122.

Upon generating the composite token, the composite token management node 124 transmits the composite token to the client 110. The client 110 stores the token in token storage 112. According to one example embodiment, the composite token management node transmits the composite token to the client 110 as a digital cookie. In such an example embodiment, the token storage 112 may be a cookie jar maintained by a web browser executing on the client 110.

For each subsequent transaction between the application 111 executing on the client 110 and the content nodes 122 which pertains to the same session, the client 110 transmits the composite token together with an access request. Access requests may include requests to provide input values and receive calculated output values, provide query values and receive query results, modify (i.e., add, delete, or change existing values) data values in one or more databases accessible by the content nodes 122, or perform any other data transactions. The API gateway 121 directs the composite token to the composite token management node 124. The composite token management node 124 deconstructs the composite token into the access segment and the regeneration segment.

The composite token management node 124 ensures that the data contained in the composite token has not been altered, compared to the most recently-generated composite token. For example, the composite token management node 124 may decrypt a signature portion of the composite token using a secret key, which may be included in the token validation data 132. The composite token management node 124 compares the decrypted data to the header and payload data, ensuring no values are altered. If the composite token management node 124 determines that any values have been altered, the composite token management node 124 may invalidate the most recently-generated composite token associated with a client ID or session ID included in the composite token. The composite token management node 124 may further transmit a request to the client 110 requesting re-authentication, such as re-entry of a username and password.

The access segment validation logic 128 analyzes the expiration time of the access segment to determine whether the access segment has expired. If the access segment has not expired, the composite token management node 124 generates instructions to the content nodes 122 to execute the access request.

If the access segment validation logic 128 determines that the access segment has expired, the regeneration segment validation logic 129 determines whether the regeneration segment is valid. Determining whether the regeneration segment is valid includes (a) determining whether the regeneration segment is the most recently-generated regeneration segment for the session associated with the composite token, and (b) determining whether the regeneration segment has expired. The regeneration segment validation logic 129 determines whether the regeneration segment is the most recently-generated regeneration segment for a session by comparing an ID value in the regeneration segment of the composite token with a stored ID value in the token validation data 132. If the values do not match, the system determines that the regeneration segment is not the most recently-generated regeneration segment for a session. The composite token management node 124 invalidates the most recently-generated regeneration segment (e.g., corresponding to the ID value stored in the token validation data). The composite token management node 124 generates a request to the client 110 requesting re-authentication, such as re-entry of a username and password.

If the regeneration segment validation logic 129 determines that the regeneration segment is the most recently-generated regeneration segment, the regeneration segment validation logic 129 determines whether the regeneration segment has expired. If the regeneration segment has expired, the composite token management node 124 transmits a request to the client 110 requesting re-authentication, such as re-entry of a username and password. If the regeneration segment has not expired (and the access segment has expired), the composite token management node 124 (a) invalidates the regeneration segment, and (b) regenerates the composite token. In particular, the access segment generation logic generates a new access segment with a predetermined expiration time. In addition, the regeneration segment generation logic generates a new regeneration segment with a predetermined expiration time longer than that of the access segment. The regeneration segment validation logic 129 stores an ID value associated with the most recently-generated regeneration segment as token validation data 132 in the data repository 130. In one or more embodiments, the composite token management node 124 generates the new composite token without requiring re-transmission, by the client device 110, of authorization data, such as a username and password. The composite token management node 124 transmits the new composite token to the client 110, which stores the composite token in the token storage 112. The application 111 transmits the new composite token with subsequent access requests to the content nodes 122.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a content provider 120 refers to hardware and/or software configured to perform operations described herein for providing content to client devices and managing composite tokens associated with content access requests. Examples of operations for managing composite tokens associated with content access requests are described below with reference to FIGS. 2A and 2B.

3. Managing Composite Tokens for Content Access Requests

Figure 2A:
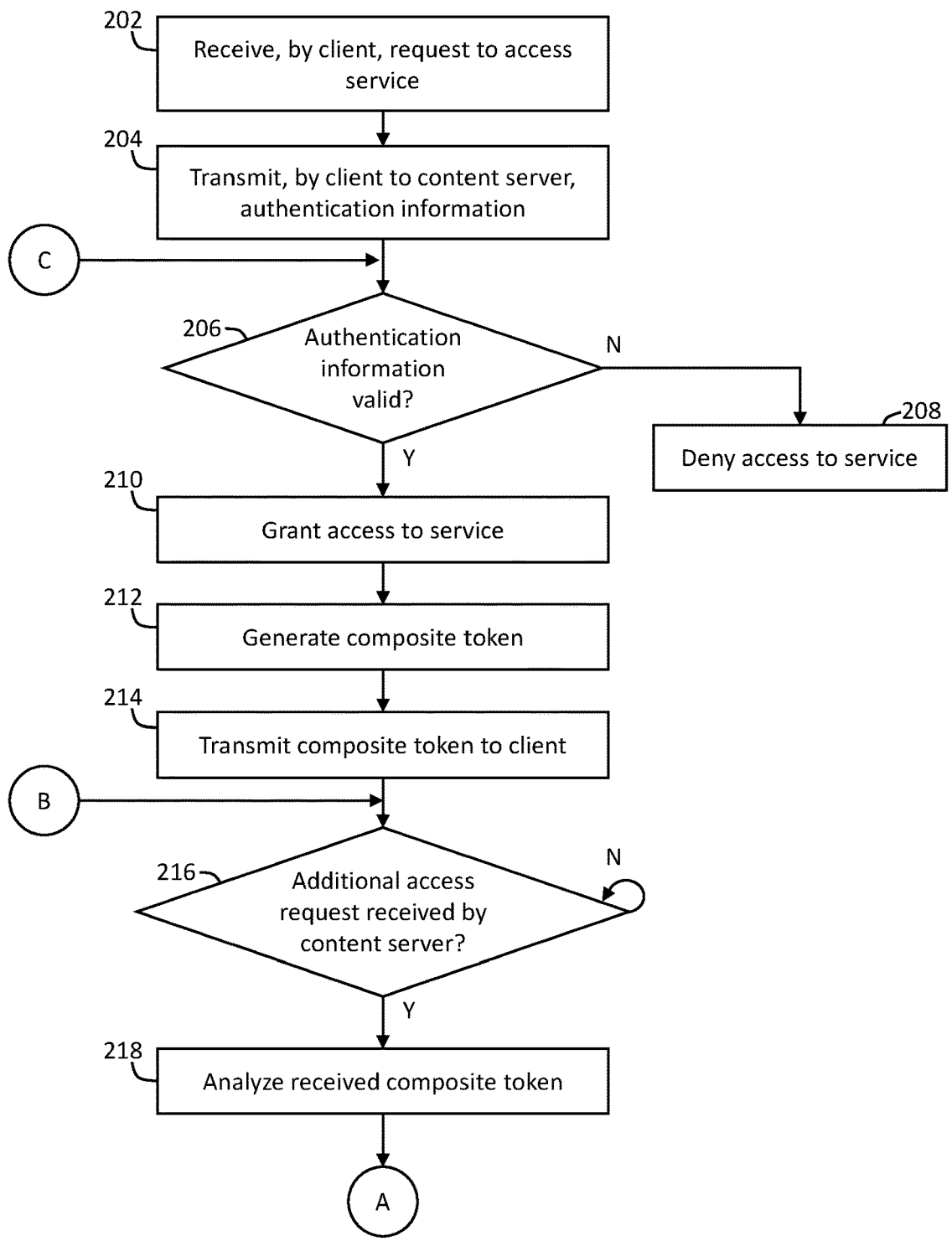
FIGS. 2A and 2B illustrates an example set of operations for managing tokens for securing electronic communications in accordance with one or more embodiments.
Figure 2B:
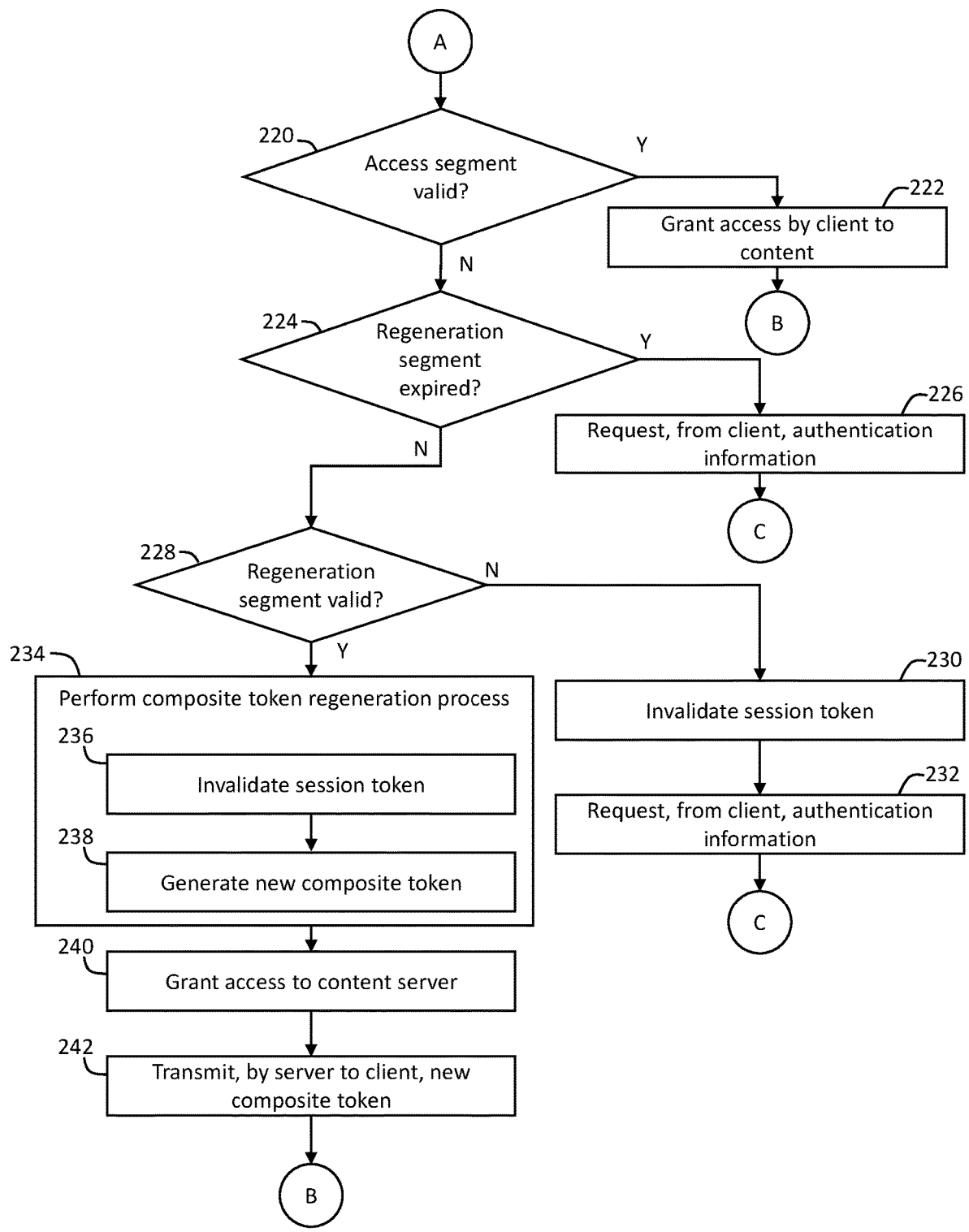

FIGS. 2A and 2B illustrate an example set of operations for managing tokens to provide increased security in device-to-device communications in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A client device receives a request to access content on a remote server of a content provider (Operation 202). For example, a user may select, on the client device, a uniform resource locator (URL) directed to a web page stored on a server cluster of the content provider.

According to one example embodiment, the request is associated with web pages displayed by a web browser. A user may navigate, on the client device, among different web pages. Navigating to a new web page may result in one or more requests to a remote server for data to render aspects of the requested web page. According to another example embodiment, the request is associated with an application hosted by a remote server. For example, a cloud service provider (CSP) may host one or more nodes storing applications accessible by the client device. Applications may include database access and management applications, business operations applications, such as human-resources applications, product development applications, and sales management applications, communications applications, such as email applications and calendar applications, and services such as hosting virtual machines (VMs) for one or more client devices on remote servers. A user may run the applications by accessing the cloud environment of the CSP via the client device.

The client device transmits authentication information to the remote server (Operation 204). Authentication information may include, for example, a username and a password entered by a user on the client device. Other types of authentication information may include a personal identification number (PIN) code, biometric information, and an identification (ID) value stored in the client device associated with a user or application. The authentication information may be entered by a user via a user interface. Alternatively, the authentication information may be stored by the client device and retrieved in response to a request from a remote server. According to yet another alternative, the authentication information may be stored in one remote server and transmitted to another remote server. For example, a user may enter authentication information to access sets of stored authentication information, such as usernames and passwords, associated with different services hosted by different remote servers. When the user requests content from one of the remote servers, the remote server storing the authentication information may transmit the authentication information to the remote server storing the content to which the user has requested access.

The client device may transmit the authentication information, or cause the authentication information to be transmitted, in response to a request from the remote server. For example, the client device may transmit to the remote server a request to access content on the remote server. The remote server may return a request for authentication information. The client device may transmit the authentication information, or cause the authentication information to be transmitted, in response to the request from the remote server.

The system determines if the authentication information is valid (Operation 206). The system compares the provided authentication information with stored authentication information. The authentication information may be stored, for example, in a database. The database may store sets of user ID's and passwords. The database may store additional information, such as permissions associated with a particular user ID.

According to one embodiment, the authentication process described in operation 206 is performed on a dedicated authentication server separate from a content server that provides content or services to a client. For example, the content server may receive the authentication information from the client device. The content server may forward the authentication information to an authentication server. The authentication server authenticates the username and passwords. The authentication server returns a result of the authentication to the content server.

If the system determines that the authentication information does not match an authorized user, the system denies access to the service (Operation 208). For example, an authentication server may return a negative authentication result to a content server. The content server may return a message to the client device that the access request is denied.

If the system determines that the authentication information matches an authorized user, the system grants access to the requested content (Operation 210). An authentication server may return a positive authentication result to a content server. The content server may return requested content to the client device. For example, the content server may return webpage content, application data, and a database query response to the client device. Alternatively, the content server may allow a client device to add, delete, or modify data values stored in the content server.

The system generates a composite token (Operation 212). The composite token includes two segments—an access segment and a regeneration segment. The access segment has a short lifespan, and the regeneration segment has a longer lifespan than the access segment. For example, a short lifespan may correspond to a duration of 5 minutes or less. A long lifespan may correspond to a duration of one hour or more. According to one example, the access segment may have a lifespan of 1 minute. The regeneration segment may have a lifespan of 4 hours.

The access segment is associated with permissions to access content. The regeneration segment is associated with permissions to (a) terminate permissions associated with access segments and previously-generated regeneration segments, and (b) generate new access segment and new regeneration segments.

The access segment and the regeneration segment may be separate files or segments of data within a single token. For example, a token may include a header, a payload, and a signature. The header includes data indicating a type of the token. The payload includes information such as user information, expiration information, and permissions information. The signature is an encrypted concatenation of the header and the payload. In an embodiment in which the access segment and the regeneration segment are separate segments of data within a single token, the payload of the token may include one string of data describing the access segment and another string of data describing the regeneration segment. Each string of data corresponds to a lifespan specified in the payload. According to one embodiment, the access segment and the regeneration segment may be concatenated into a single string of data.

According to an alternative embodiment, the access segment and the regeneration segment may be separate tokens, data files, or cookies. In an example in which the access segment and the regeneration segment are separate tokens, each token may include a separate header, payload, and signature. For example, the separate tokens may be separate JavaScript Object Notation (JSON) Web Tokens (JWTs). The system generates the composite token by storing the separate tokens together in the same composite token, data file, or digital cookie.

The system transmits the composite token to the client device (Operation 214). For example, a content server which includes the requested content may transmit the composite token to the client device together with requested content. As another example, an authentication server may transmit the composite token to the client device. The system may encrypt the composite token prior to transmitting the token. The system may encrypt (a) the entire composite token, or (b) a portion of the composite token. For example, in an embodiment in which the composite token includes two data strings in a token payload corresponding to the access segment and the regeneration segment, the system may encrypt the payload prior to transmitting the composite token. Encrypting the payload may prevent the client device, or any other device, from determining the nature and characteristics of the access segment and the regeneration segment.

According to one embodiment, the system sends the composite token to the client device as two data files or two tokens stored within a same data file, such as a digital cookie. For example, a client device may access the content server with a web browser. The content server transmits the cookie to the client device, which stores the cookie in a data storage (e.g., cookie jar) of the web browser.

The content server determines whether it has received an additional access request from the client (Operation 216). Since the system provided the client with a composite token subsequent to validating the user's username and password, the user does not need to provide the username and password with each access request. Instead, the client device transmits the composite token with each subsequent access request.

The system analyzes the composite token received with the access request (Operation 218). The system deconstructs the composite token into the access segment and the regeneration segment. The system identifies an expiration time for the access segment and an expiration time for the regeneration segment.

According to an example embodiment, the system may decrypt the composite token. The system may apply a secret key stored in an authentication server to the encrypted composite token to decrypt the composite token. The system may further decode any encoded elements of the decrypted token. The system may identify parts of the decrypted, decoded token, including (a) a header, (b) identification information associated with the authentication server, (c) identification information associated with a user, (d) permissions data, (e) an access segment identifier, (f) an access segment expiration time, (g) a regeneration segment identifier, (h) a regeneration segment expiration time, and (i) a token signature. The token signature may correspond to an encryption of the concatenated header and payload. The system may compare the decrypted token signature with the decoded content in the token header and token payload to ensure the token header and token payload have not been tampered with. For example, if a user or application attempts to alter any value in the token header or payload, then the result will not match the values in the decrypted token signature. Similarly, if a user or application alters the encrypted token signature, the result will not match the values in the token header or token payload.

The system determines whether the access segment of the composite token is valid (Operation 220). The system may analyze the expiration time associated with the access segment to determine whether the access segment has expired. For example, if the expiration time is ten seconds, and if fifteen seconds have elapsed, the system may determine that the access segment has expired. In addition, the system may ensure values associated with the access segment have not been tampered with. For example, the system may ensure that the expiration time in a payload portion of the token matches the expiration time in the encrypted signature portion of the token. As another example, if the access segment includes a value corresponding to an access level of the access segment, the system ensures that the access level indicated in the token payload matches the access level in the decrypted token signature.

If the access segment has not expired, the system grants the client access to the requested content (Operation 222). The system may ensure that an ID associated with the composite token has permission to access the requested content prior to granting access. For example, the access segment may include a value representing a permissions level. The value may be associated with a particular user, a particular client device, and/or a particular session. The system may perform both of (a) determining whether the access segment has expired, and (b) determining that the requesting entity has permission to access the requested content prior to granting access to the content.

If the system determines that the access segment has expired, the system determines whether the regeneration segment has expired (Operation 224). Determining whether the regeneration segment has expired includes determining whether an expiration time associated with the regeneration segment has passed. For example, if an expiration time associated with the access segment is 5 seconds, and the expiration time associated with the regeneration segment is one hour, the system determines whether an hour has elapsed since creation of the regeneration segment.

If the system determines that the regeneration segment has expired, the system requests authentication information, such as the username and password, from the client device (Operation 226). The system refrains from granting access to the client device until the authentication information is verified.

If the regeneration segment is not expired, the system still determines whether the regeneration segment is valid (Operation 228). Determining whether the regeneration segment is valid may include comparing an ID of the regeneration segment with an ID stored in an authentication server. The ID stored in the server may correspond to an ID of a most recently-generated regeneration segment. If the IDs do not match, the system may determine that the regeneration segment is invalid.

If the system determines that the regeneration segment is not valid, the system invalidates any existing regeneration segments associated with a session ID or user ID included in the composite token (Operation 230). For example, a composite token may include a user ID value associated with an authorized user. The system may invalidate any composite tokens associated with the user ID value.

The system requests authentication information, such as the username and password, from the client device (Operation 232). The system refrains from granting access to the client device until the authentication information is verified.

According to one or more embodiments, the system stores a segment ID associated with only the most recently-generated regeneration segment. According to an alternative embodiment, the system stores a token ID associated with the most recently-generated composite token. According to an alternative embodiment, the system maintains a log of previously-generated regeneration segments associated with a particular user ID or session ID. For example, the system may record the creation of an initial composite token and nine subsequent composite tokens associated with a session between a user associated with a specified user ID value and a content server. If the system identifies the regeneration segment as being associated with a previous composite token, or a composite token that is not the most recent composite token in a particular session, the system may generate a notification to alert a user of potential fraud. The system may access user contact information associated with the user ID to send the notification to the particular user.

In addition to invalidating the most recently-generated composite token, the system requests, from the client device, re-transmitting of authorization information (Operation 232).

If the system determines in operation 228 that the regeneration segment is valid, the system performs a token regeneration process (Operation 234). Regenerating a composite token includes (a) invalidating an existing session token associated with the same session (Operation 236), and (b) generating a new composite associated with the same session including a new access segment and a new regeneration segment (Operation 238). Invalidating a session token may include modifying a value in a database or memory associated with one or more composite tokens. For example, the system may store in memory a table entry specifying the current regeneration segment associated with a session. The system may enter a value in the table indicating that that the regeneration segment is no longer valid. According to an alternative embodiment, the system may delete a value associated with the token from a field provided for a current regeneration segment. According to yet another embodiment, the system may change an encryption secret associated with a signature of a regeneration segment, rendering any previously-generated regeneration segments invalid.

Generating a new composite token (Operation 238) includes generating a new access segment and generating a new regeneration segment. The new composite token may include some information carried over from a previous composite token. For example, the new composite token and the previous composite token may share a same header, a same user ID, a same session ID, and the same permissions.

According to one embodiment, generating a new regeneration segment includes determining a duration of time remaining until expiration of an old regeneration segment and setting the expiration of time for the new regeneration segment as the same duration of time that was remaining for the old regeneration segment. For example, the system may determine that an access segment expired, a regeneration segment was not expired and was valid, the expiration time for the regeneration segment was one hour, and the regeneration segment had fifty minutes remaining until expiration of the regeneration segment. The system may generate the new regeneration segment of the new composite token with an expiration time of fifty minutes. As the system subsequently regenerates the composite token, the expiration time for each successive regeneration segment diminishes according to an amount of time that passed since creation of the regenerated composite token. According to such an embodiment, the expiration time of the regeneration segment defines a minimum amount of time that will pass before the system requires a user to re-enter authentication information.

According to an alternative embodiment, generating a new regeneration segment includes setting the expiration time for the new regeneration segment to a predetermined, fixed duration of time. For example, the system may determine that an access segment expired, a regeneration segment was not expired and was valid, the expiration time for the regeneration segment was five minutes, and the regeneration segment had two minutes remaining until expiration of the regeneration segment. The system may generate the new regeneration segment of the new composite token with an expiration time of five minutes. According to such an embodiment, the expiration time of the regeneration segment defines the maximum amount of time that may pass between access segment expirations without requiring a user to re-authenticate with a username and a password. In other words, as long as a user continues to generate access requests within five-minute intervals, the system will continue regenerating composite tokens corresponding to a user session, without requiring the user to enter a username and password.

Upon generating a new composite token associated with the user session, the system grants the access request to the content server (Operation 240). In addition, the system transmits the new composite token to the client (Operation 242). The client transmits the new composite token to the content server in one or more subsequent access requests.

According to the process described in FIGS. 2A and 2B, a system may provide users with access to resources, without the need to frequently re-enter authentication information, by generating and regenerating composite tokens associated with a user session with a content server. The composite token includes an access segment and a regeneration segment. The access segment has a relatively short life span, and the regeneration segment has a relatively long life span. A user may make any number of access requests to a content server during the life span of the access segment without re-providing authentication information and without the system requiring regeneration of the composite token. If the user makes an access request after the life span of the access segment has elapsed, the system invalidates the old composite token and generates a new composite token associated with the session. The user may continue making access requests using the new composite token, without re-providing authentication information.

By generating new composite tokens over the course of a user session (via a client device) with a content server, the system may detect and reduce fraudulent use of a token. For example, if an unauthorized user steals a composite token, the system will detect that two different composite tokens are being attempted to be used by the unauthorized user and the authorized user. Not knowing which source is the authorized user, the system invalidates the current composite token and requires any subsequent access requests be accompanied by authentication information, such as a username and password. Since only an authorized user should have access to the username and password, any fraudulent access to a content server may be minimized.

According to one or more embodiments, a user may generate command to terminate access to resource. For example, a user may terminate a session by logging out of an application account. Logging out of a session may invalidate any current tokens associated with the session.

As noted above, operations in FIG. 2A-2B may be performed in a different order. For example, FIG. 2B shows a system performing a composite token regeneration process (Operation 234), granting access to a content server (Operation 240), and transmitting a new composite token to a client (Operation 242). According to an alternative embodiment, the system may refrain from granting access to the content server (Operation 240) until after a client has received a new composite token (Operation 242) and re-transmitted the request with the new composite token (Operation 216).

According to one or more embodiments, the composite tokens are associated with session-based authentication. A session may correspond to a series of one or more interactions between a user accessing a client device and a content server. The content server may be a single server or a set of two or more servers. For example, content may be stored on a virtual machine distributed over multiple servers and accessed by a gateway server. A system may generate a composite token, and regenerate multiple composite tokens, over the course of a single session. The system may initiate a session based on a user entering a username and password. The system may generate an initial composite token including the session ID. As a user initiates access requests after expiration of access segments, the system regenerates composite tokens associated with the session ID. Accordingly, one session may be associated with multiple composite tokens, although only the most recently-generated composite token is valid. The composite token may be a session cookie, or a digital file including session data. A content server may refer to the session data in the cookie to access session information. For example, a composite token may include (a) a session ID, (b) an access segment, and (c) a regeneration segment. A client device may transmit the session cookie to a content server. The content server, or an authentication server, may deconstruct the session cookie to identify the session ID. The system may access session data at a location in data storage associated with the session ID to determine access permissions associated with the session and other session details such as access request logs. The data storage associated with the session ID may also store encryption data, such as a secret key associated with the session and a regeneration segment ID of a most recently-generated regeneration segment.

According to one or more embodiments, the composite tokens are associated with token-based authentication. Each composite token includes (a) a requesting-entity ID, (b) an access segment, and (c) a regeneration segment. The token may further include expiration times for the access segment and the regeneration segment. Upon receiving a composite token, the system compares an access requested to an access associated with the requesting-entity ID. If the composite token is valid, the system grants access. If the system determines, based on the expiration data included in the composite token, that the access segment has expired, the system regenerates a composite token using the information in the previous composite token. The system updates the expiration times for the access segment and the regeneration segment in the new composite token.

According to one or more embodiments, accessing a content server requires single application programming interface (API) call. For example, client may generate a POST API call including an access request and a composite token. The client sends the POST API call to a content service provider. An API gateway of the content service provider transmits the composite token to an authentication server. Based on authentication, the authentication server may direct a content server to grant the client's request. The authentication server may further perform operations of (a) determining whether an access segment is expired, (b) determining whether a regeneration segment is expired and/or valid, and (c) regenerating a new composite token and transmitting the new composite token to the client.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A-3D illustrate an example sequence of operations of an authorized client, an unauthorized client, and a server. In the embodiment illustrated in FIGS. 3A-3D, the content provider 320 includes functionality to (a) authenticate a user requesting access via a client, (b) validate a composite token, and (c) provide access to content managed by the content provider 320.

A user opens a web browser on an authentic client 301 and accesses a website login page 302. In the example embodiment, the authentic client 301 is a client device (e.g., personal computer, laptop, or mobile device) accessed by a user with authority to access content in the content provider 320. The website login page includes fields for user information, including a user identified (ID), such as a username, and a password. The authentic client 301 receives the username and password 303. The authentic client 301 transmits to the content provider 320 the username and password, together with an access request to access a webpage stored on the content provider 320.

Figure 3A:
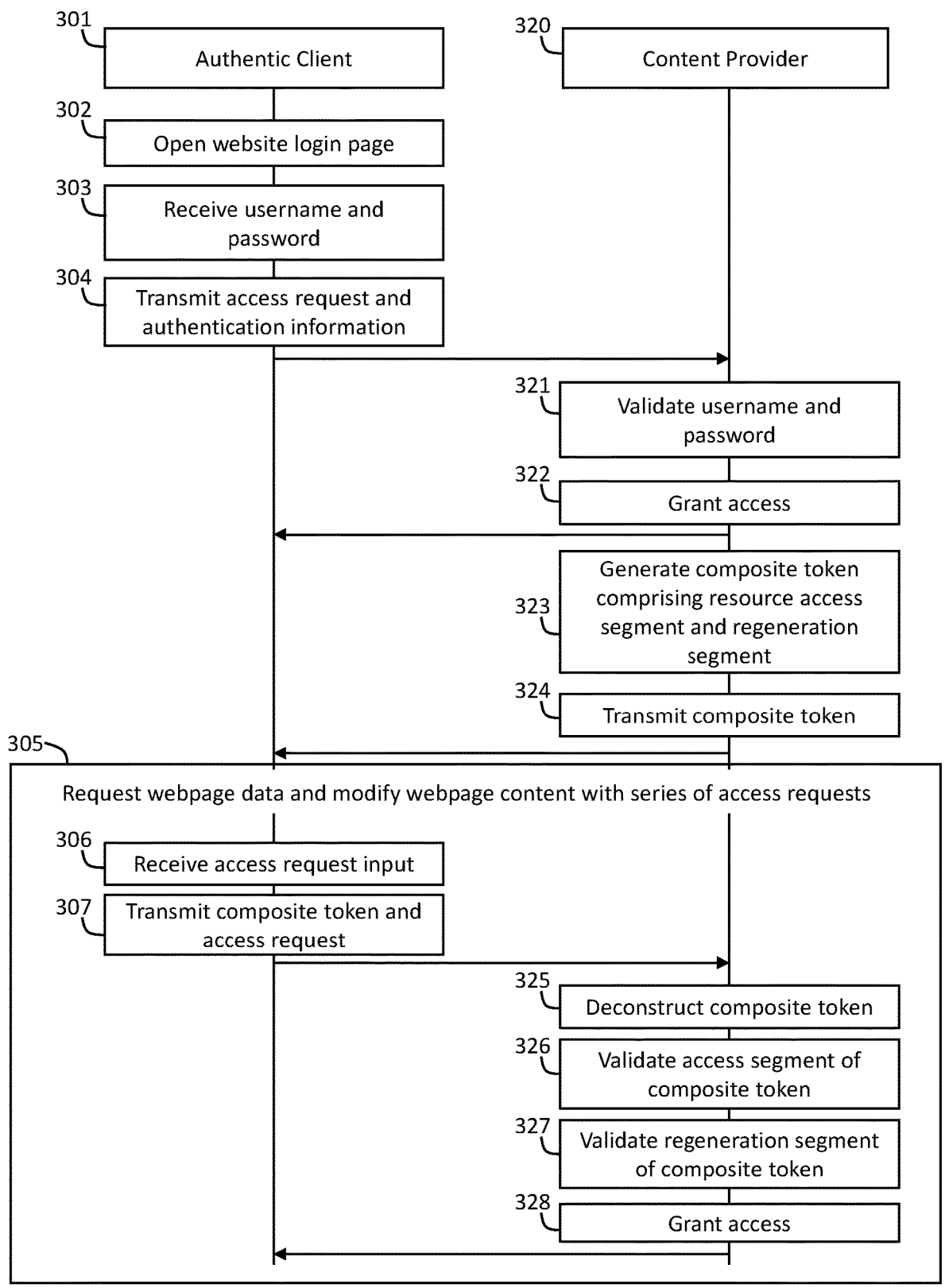
FIGS. 3A-3D illustrate an example embodiment.

The content provider 320 validates the username and password (Operation 321). The content provider 320 grants the client device 301 access to the service provided by the content provider 320 (Operation 322). In the example of FIG. 3A, the content provider 320 grants the authentic client 301 access to a web page according to the user's authority settings. To increase the security of subsequent requests, the content provider 320 generates a composite token (Operation 323). The composite token includes an access segment and a regeneration segment. In the example embodiment of FIG. 3A, the access segment a data string. The access segment includes identification information which specifies the type of segment (i.e., "access segment"). The access segment may include permissions associated with the user authorized to use the access segment. The access segment includes expiration information associated with the access segment. The regeneration segment also includes identification information, permissions information, and expiration information. The expiration time assigned to the access segment is two (2) minutes. The expiration time assigned to the regeneration segment is eight (8) hours. The content provider 320 concatenates the access segment and the regeneration segment. The content provider 320 encrypts the concatenated access segment and regeneration segment and stores the encrypted data as payload data in a composite token. The composite token includes a header, a payload, and a signature. The header includes data indicating a type of the token. The content provider 320 includes the encrypted access segment and regeneration segment in a payload of the composite token. The composite token includes a header, a payload (including values corresponding to the encrypted access segment and the encrypted regeneration segment), and a signature. The header describes a type of the token. The payload includes information such as user information and permissions information. The signature is an encrypted concatenation of the header and the payload.

The content provider 320 transmits the composite token 324 to the authentic client 301. The authentic client 301 stores the token. For example, a web browser running on the authentic client 301 may store the token in a token-storage folder.

Subsequent to receiving the composite token, the authentic client 301 generates a sequence of requests (Operation 305) to access webpage data and to modify content associated with the webpage data. For example, one request (Operation 306) may result in obtaining data to display a home page of a financial website. Subsequent requests may result from a user navigating through web pages of the financial website, initiating financial transactions, etc. For each request received from a user or a program running on the authentic client 301, the authentic client 301 transmits the request, together with the composite token, to the content provider 320 (Operation 307). For each request received from the authentic client 301, the content provider 320 (a) deconstructs the composite token (Operation 325), (b) validates the access segment of the composite token (Operation 326), (c) validates the regeneration segment of the authentic token (Operation 327), and (d) grants the authentic client 301 access to services and/or content on the content provider 320 (Operation 328).

The system may validate the access segment and the regeneration segment by (a) decrypting the signature of the composite token, (b) ensuring the decrypted content matches the payload of the composite token, (c) decrypting the payload (including the access segment and the regeneration segment), (d) ensuring the access segment has not expired, (d) ensuring the regeneration segment is the most recently-generated regeneration segment corresponding to a session identified in the composite token, and (e) ensuring the regeneration segment has not expired.

The content provider 320 stores a secret key in a secure database. The content provider 320 decrypts the composite token using the secret key. The content provider 320 extracts identification information from the payload. For example, the identification information may include an ID value associated with the composite token. If a composite token associated with a current session between the client 301 and the content provider 320 is regenerated ten times (e.g., if a user has made ten requests within separate intervals of time of at least 2 minutes in duration), the system may generate eleven separate composite tokens, each corresponding to a separate ID value. Only the most recently-generated ID value is considered by the system to be a valid ID value. The content provider 320 validates the access segment and the regeneration segment by (a) validating the ID value of the composite token, and (b) validating that the access segment and the regeneration segment are not expired.

The system may the ID value of the composite token by comparing an ID value in the payload of the composite token with a stored ID value. Each time the content provider 320 regenerates the access segment and the regeneration segment, the system may replace the previously-stored ID value with the most recently-generated ID value.

The content provider 320 also identifies the expiration times of the access segment and regeneration segment. If the expiration times have not passed, and if the composite token is the most recently-generated composite token, the content provider 320 validates the access segment and regeneration segment and grants access to the authentic client 301 (Operation 328).

Figure 3B:
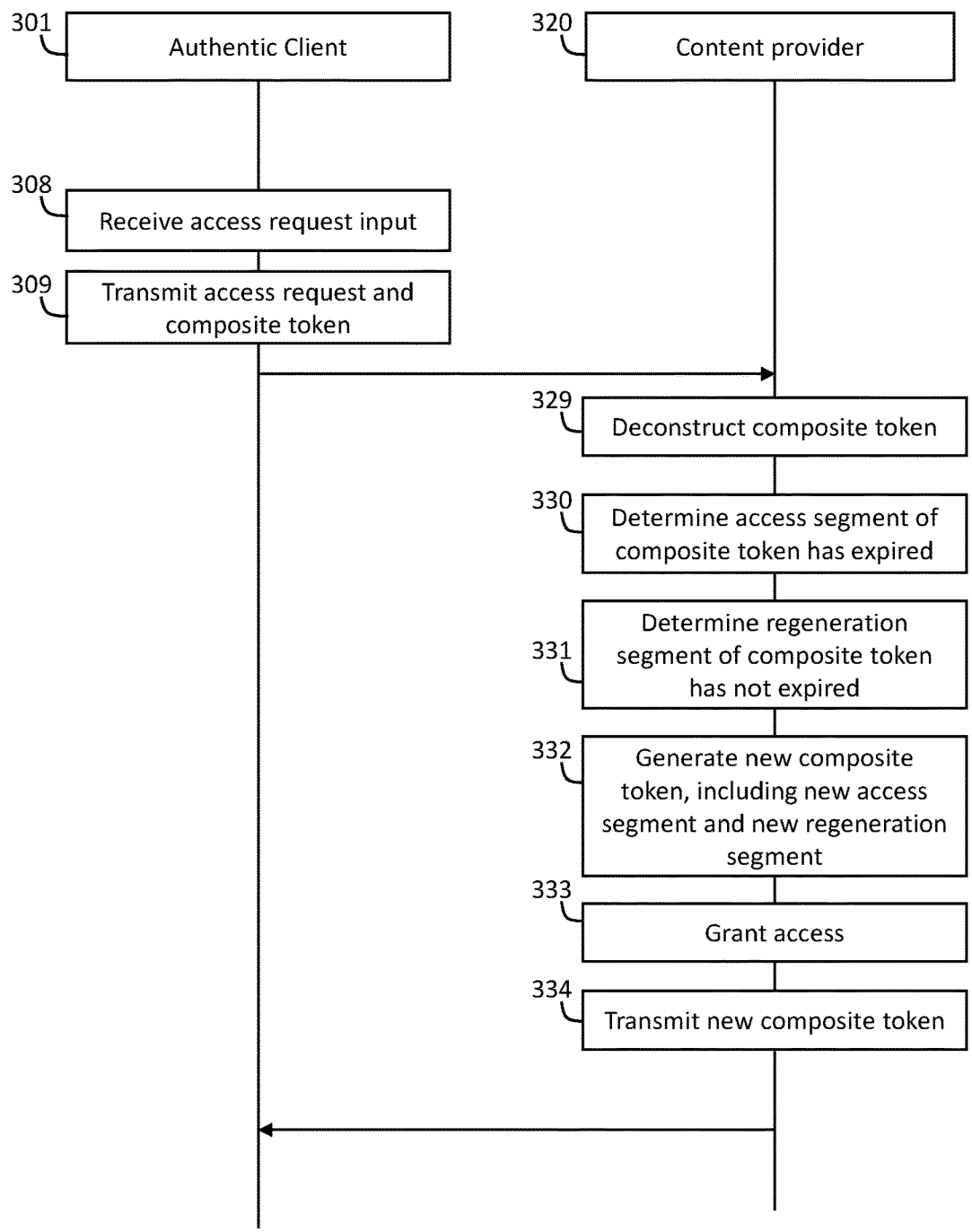

FIG. 3B illustrates regenerating the composite token by the content provider 320. The authentic client 301 receives input—from a user or from an application—to access a content provider 320 (Operation 308). The authentic client 301 transmits the request and a previously-received composite token to the content provider 320 (Operation 309). The content provider 320 (a) deconstructs the token into the access segment and the regeneration segment (Operation 328), (b) determines the access segment has expired (Operation 330), and (c) determines the regeneration segment has not expired (Operation 331). For example, the client may transmit the request and composite token (Operation 309) after at least two minutes has passed since generation of the composite token and within eight hours of generation of the composite token.

Based on the determination that (a) the regeneration segment has not expired and (b) the access segment has expired, the content provider 320 invalidates the regeneration segment, generates a new access segment, and generates a new regeneration segment. The content provider 320 generates a new composite token including the new access segment and the new regeneration segment (Operation 332). The new composite token includes in its payload a new token ID value. The system stores the new token ID value to validate subsequently-received composite tokens as the most recently-generated composite token. In particular, the system replaces the previously-stored token ID value with the new token ID value. As discussed above, generating the new token includes encrypting the payload (including the access segment and the regeneration segment) and generating a header and signature. The content provider 320 grants the authorized client 301 access to server content (Operation 333) and transmits the new composite token to the authorized client (Operation 334).

Figure 3C:
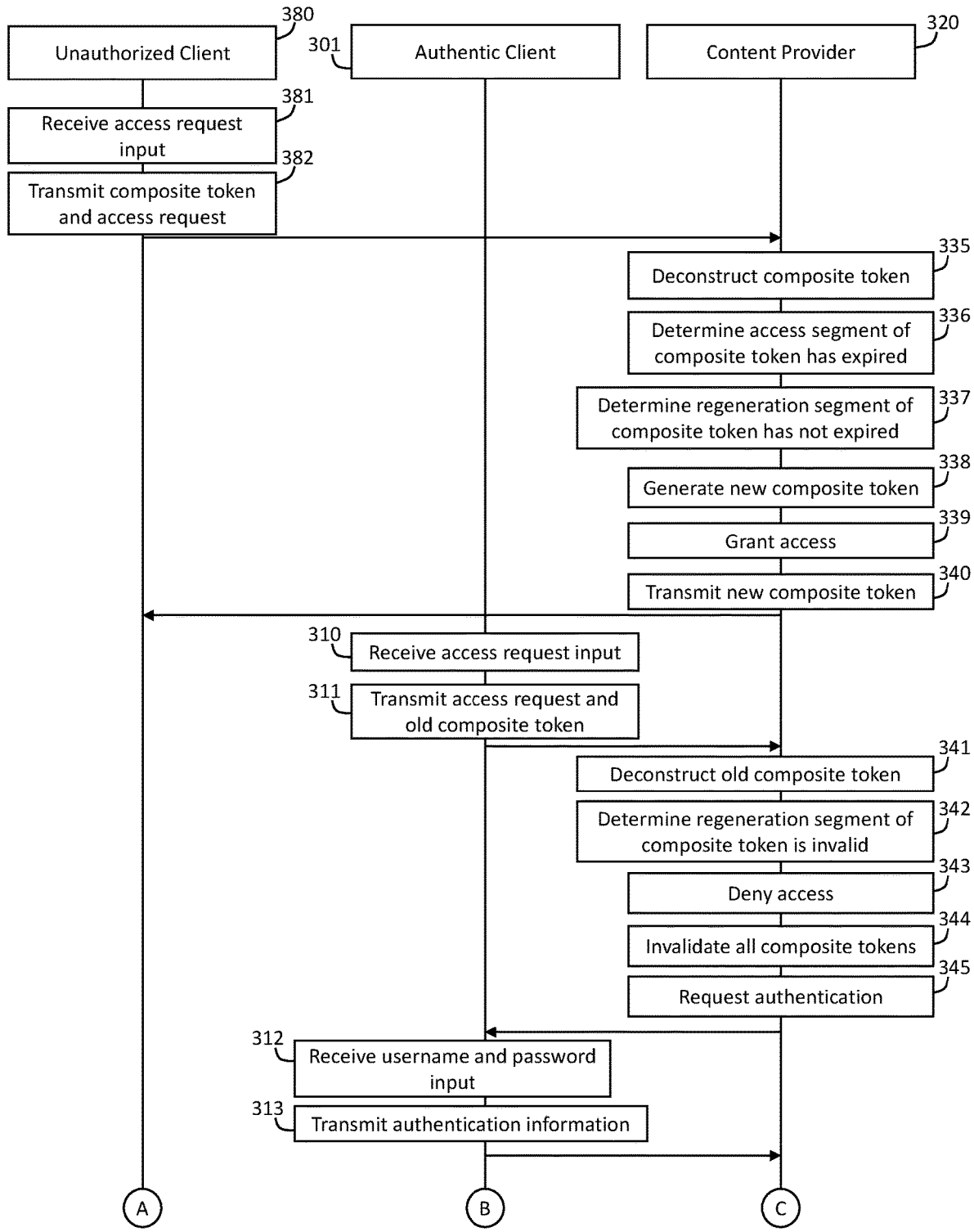

FIG. 3C illustrates how the composite token facilitates fraud detection and minimizing fraudulent use of a composite token when an unauthorized client 380 obtains the composite token.

An unauthorized client 380 is a device associated with a user who has fraudulently obtained a composite token. For example, an authentic user may visit a website, resulting in malware being installed on the authentic client 301. The malware may steal the composite token from the authentic client 301. The malware may transmit tokens, including the composite token, to the unauthorized client without knowledge or permission of a user associated with the authentic client 301.

The unauthorized client 380 receives an input (such as a user input of an unauthorized user, or a request from an unauthorized application) requesting access to content on the content provider 320 (Operation 381). The unauthorized client 380 transmits the access request, together with the stolen composite token, to the content provider 320 (Operation 382). The content provider 320 deconstructs the composite token into the access segment and the regeneration segment (Operation 335). The server determines that (a) the access segment of the composite token has expired (Operation 336), (b) the regeneration segment of the composite token has not expired (Operation 337), and (c) the composite token is the most-recently generated composite token. Accordingly, as discussed above in FIG. 3B, the content provider 320 invalidates the previous regeneration segment, generates a new access segment, and generates a new regeneration segment. The content provider 320 generates a new composite token including the new access segment and the new regeneration segment (Operation 338). The system further grants access to the unauthorized client 380 to access content on the content provider 320 (Operation 339). The content provider 320 transmits the new composite token to the unauthorized client 380 (Operation 340).

While the unauthorized client 380 may have access to the content provider 320 for a time, at some point a user associated with the authentic client 301 generates an input to request access to content on the content provider 320 (Operation 310). Unaware of the theft and regeneration of the composite token, the authentic client 301 transmits the old composite token, together with the access request, to the content provider 320 (Operation 311). The content provider 320 deconstructs the old composite token (Operation 341) and determines that the access segment is invalid. The content provider 320 then determines that the regeneration segment is invalid (Operation 342), since the token ID associated with the composite token does not match the composite ID associated with the most recently-generated composite token. Based on determining that the regeneration segment received from the authentic client 301 is invalid, the content provider 320 denies access to the authentic client 301 (Operation 343).

In addition, the content provider 320 invalidates any existing composite tokens associated with the client ID of the authentic client 301 (Operation 344). In other words, the content provider 320 invalidates the new composite token that was transmitted to the unauthorized client 380. The content provider 320 further requests authentication from the authentic client 301 in response to the access request (Operation 345).

Figure 3D:
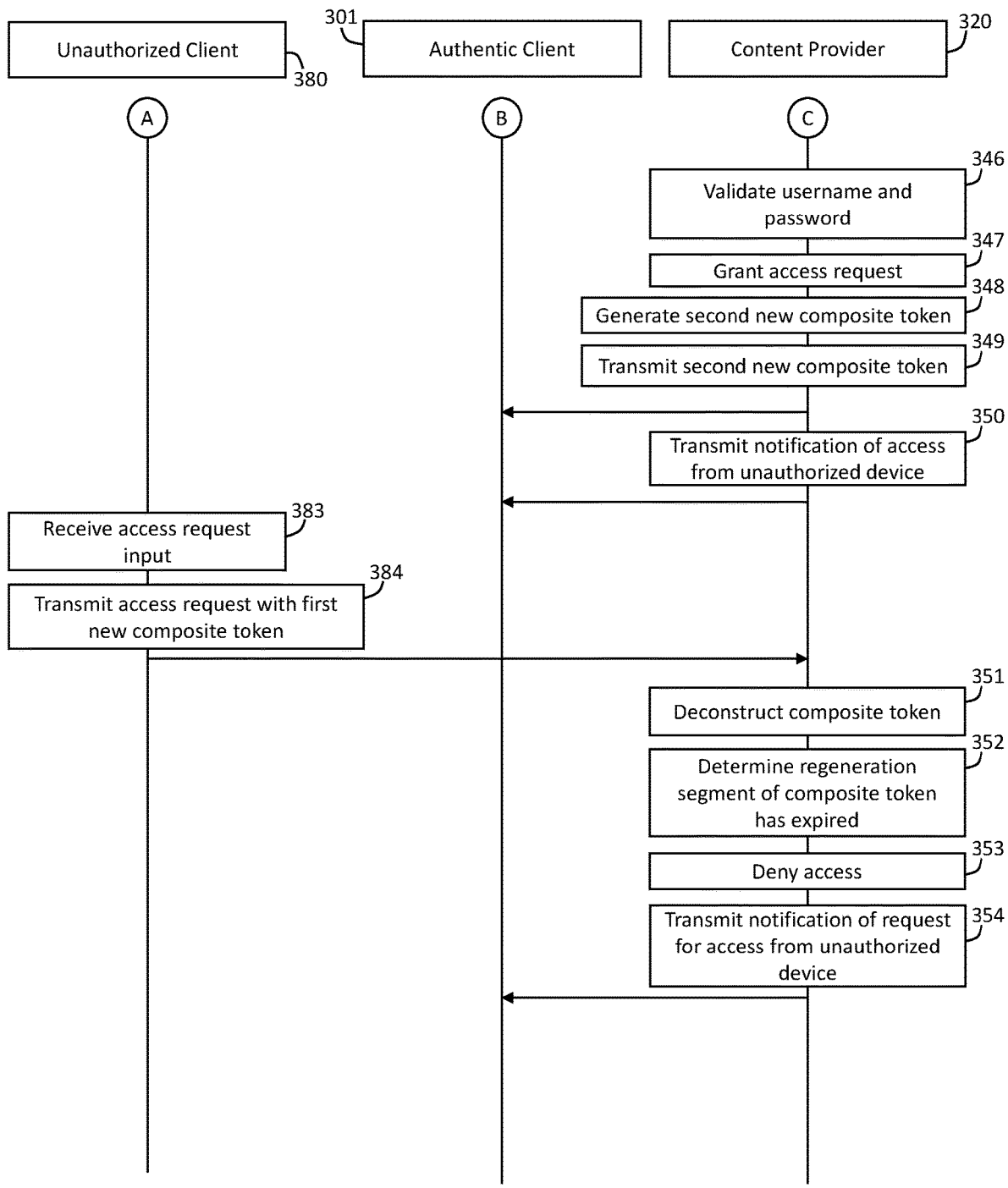

The authentic client 301 receives a username and password from a user (Operation 312). The authentic client 301 transmits the username and password to the content provider 320 (Operation 313). Referring to FIG. 3D, the content provider 320 validates the username and password (Operation 346). Based on validating the username and password, the content provider 320 grants the authentic client 301 access to the content provider 320 (Operation 347). The content provider 320 generates a new composite token (Operation 348) and transmits the new composite token to the authentic client 301 (Operation 349). In addition, the content provider 320 transmits to the authentic client 301 a notification that an unauthorized device used a composite token (Operation 350).

The unauthorized client 380 is unaware of the authentic client's 301 access to the content provider 320. Therefore, the unauthorized client 380 may continue to receive access requests from a user or application (Operation 383) and transmit the previously-recited new authentic token to the content provider 320 (Operation 384). The content provider 320 deconstructs the composite token (Operation 351), determines that the regeneration segment has expired (Operation 352), and denies the unauthorized client 380 access to the content in the content provider 320 (Operation 353). In addition, based on determining that the composite token received with the most recent access request was an older version than the version provided to the authentic client 301 in response to receiving an authentic username and password, the content provider 320 transmits a notification to the authentic client 301 that a request was made from an unauthorized device (Operation 354). For example, the content provider 320 may look up an email address associated with the authorized username and password and transmit the notification to the corresponding email address.

5. Computer Networks and Cloud Networks

In one or more embodiments, a content provider, including the composite token management node 124 of FIG. 1, is implemented over a computer network. A computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
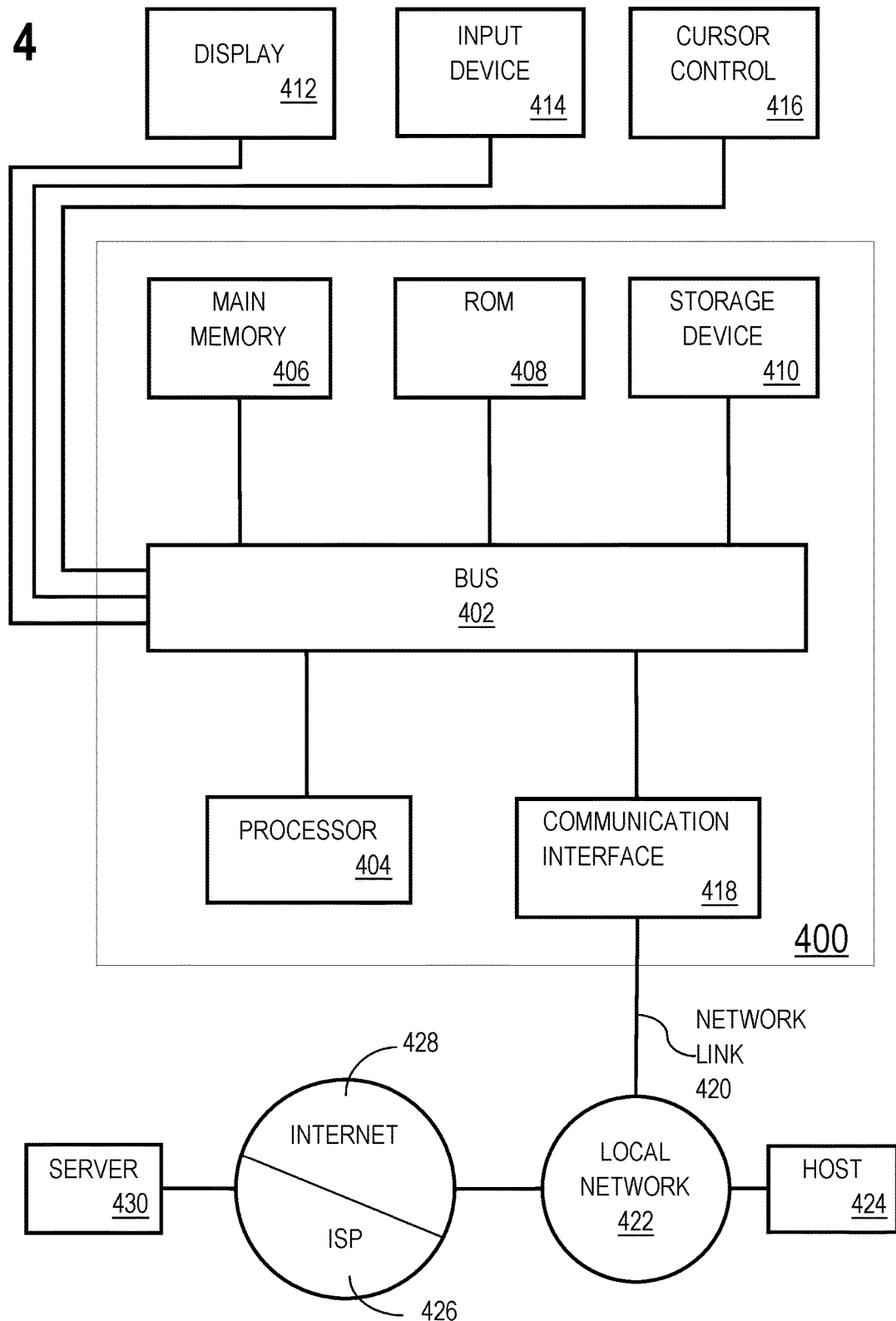
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   executing an authorization process that successfully authorizes a client device;
   responsive to successfully authorizing the client device:
      generating a first composite token comprising a first access segment and a first regeneration segment,
      wherein the first access segment is associated with permissions to access a resource, and
      wherein the first regeneration segment is associated with permissions to (a) terminate permissions associated with the first access segment and (b) generate a second access segment with permissions to access the resource;
   transmitting the first composite token to the client device, wherein the client device obtains access to the resource by transmitting the first composite token to a server;
   receiving (a) a first request to access the resource, and (b) the first composite token;
   responsive to receiving the first composite token:
      decomposing the first composite token to identify the first access segment and the first regeneration segment; and
      determining that the first access segment has expired and the first regeneration segment has not expired;

responsive to determining that the first access segment has expired and the first regeneration segment has not expired:
   granting access to the resource;
   terminating permissions associated with the first composite token; and
   generating a second composite token comprising a second access segment and a second regeneration segment,
      wherein the second access segment is associated with permissions to access the resource,
      wherein the second regeneration segment is associated with permissions to (a) terminate permissions associated with the second access segment and (b) generate a third access segment with permissions to access the resource; and
   transmitting, to the client device, the second composite token.

2. The non-transitory computer readable medium of claim 1, the operations further comprising:
   subsequent to transmitting the second composite token to the client device, receiving a second request to access the resource, the second request comprising the first composite token; and
   responsive to receiving the second request comprising the first composite token subsequent to transmitting the second composite token:
      invalidating the second composite token; and
      requiring re-execution of the authentication process for access to the resource.

3. The non-transitory computer readable medium of claim 2, wherein the second composite token is invalidated further responsive to determining at least one of:
   the first composite token is not a latest-generated composite token; and
   the first composite token is not an active composite token.

4. The non-transitory computer readable medium of claim 2, further responsive to receiving the request comprising the first composite token subsequent to transmitting the second composite token:
   transmitting a notification to the client device corresponding to unauthorized usage of the first composite token.

5. The non-transitory computer readable medium of claim 1, wherein the client device does not have functionality to extract the first access segment or the first regeneration segment from the first composite token.

6. The non-transitory computer readable medium of claim 1, wherein generating the first composite token comprises encrypting a combination of the first access segment and the first regeneration segment to deter access by the client device to (a) individual segments within the first composite token, (b) decipherable data stored in the first composite token, or (c) reverse engineer the first composite token.

7. The non-transitory computer readable medium of claim 1, wherein the first regeneration segment further has permissions to terminate permissions associated with the first regeneration segment and generate the second regeneration segment.

8. The non-transitory computer readable medium of claim 1, wherein the operations further comprise:
   responsive to receiving user input comprising a command to terminate access to the resource, invalidating the second composite token at least by terminating permissions associated with the second access segment and the second regeneration segment.

9. The non-transitory computer readable medium of claim 1, wherein each access segment expires after a first duration of time and each regeneration segment expires after a second duration of time, and
   wherein the first duration of time is shorter than the second duration of time.

10. The non-transitory computer readable medium of claim 1, wherein the operations further comprise:
    responsive to determining that the second regeneration segment has expired and the second access segment has not expired:
       terminating permissions associated with the second access segment; and
       requiring re-authentication via the authentication process for access to the resource.

11. The non-transitory computer readable medium of claim 1, wherein the first request to access the resource corresponds to a single Application Programming Interface (API) call of a single API, and
    wherein the single API call corresponds to operations of (a) decomposing a particular composite token to identify a particular access segment and a particular regeneration segment, (b) determining whether the particular access segment has expired, and (c) determining whether the particular regeneration segment has expired.

12. The non-transitory computer readable medium of claim 1, the operations further comprising:
    subsequent to transmitting the second composite token to the client device, receiving a second request to access the resource, the second request comprising the first composite token; and
    responsive to receiving the second request comprising the first composite token subsequent to transmitting the second composite token:
       invalidating the second composite token; and
       requiring re-execution of the authentication process for access to the resource,
       wherein the second composite token is invalidated further responsive to determining at least one of:
          the first composite token is not a latest-generated composite token; and
          the first composite token is not an active composite token; and
       transmitting a notification to the client device corresponding to unauthorized usage of the first composite token,
    wherein the client device does not have functionality to extract the first access segment or the first regeneration segment from the first composite token,
    wherein generating the first composite token comprises encrypting a combination of the first access segment and the first regeneration segment to deter access by the client device to (a) individual segments within the first composite token, (b) decipherable data stored in the first composite token, or (c) reverse engineer the first composite token,
    wherein the first regeneration segment further has permissions to terminate permissions associated with the first regeneration segment and generate the second regeneration segment,
    wherein the operations further comprise:
       responsive to receiving user input comprising a command to terminate access to the resource, invalidating the second composite token at least by terminating permissions associated with the second access segment and the second regeneration segment, wherein each access segment expires after a first duration of time and each regeneration segment expires after a second duration of time, and
wherein the first duration of time is shorter than the second duration of time,
wherein the operations further comprise:
responsive to determining that the second regeneration segment has expired and the second access segment has not expired:
terminating permissions associated with the second access segment; and
requiring re-authentication via the authentication process for access to the resource, and
wherein the first request to access the resource corresponds to a single Application Programming Interface (API) call of a single API, and
wherein the single API call corresponds to operations of (a) decomposing a particular composite token to identify a particular access segment and a particular regeneration segment, (b) determining whether the particular access segment has expired, and (c) determining whether the particular regeneration segment has expired.

13. A method comprising:
executing an authorization process that successfully authorizes a client device;
responsive to successfully authorizing the client device:
generating a first composite token comprising a first access segment and a first regeneration segment,
wherein the first access segment is associated with permissions to access a resource, and
wherein the first regeneration segment is associated with permissions to (a) terminate permissions associated with the first access segment and (b) generate a second access segment with permissions to access the resource;
transmitting the first composite token to the client device, wherein the client device obtains access to the resource by transmitting the first composite token to a server;
receiving (a) a first request to access the resource, and (b) the first composite token;
responsive to receiving the first composite token:
decomposing the first composite token to identify the first access segment and the first regeneration segment; and
determining that the first access segment has expired and the first regeneration segment has not expired;
responsive to determining that the first access segment has expired and the first regeneration segment has not expired:
granting access to the resource;
terminating permissions associated with the first composite token; and
generating a second composite token comprising a second access segment and a second regeneration segment,
wherein the second access segment is associated with permissions to access the resource,
wherein the second regeneration segment is associated with permissions to (a) terminate permissions associated with the second access segment and (b) generate a third access segment with permissions to access the resource; and
transmitting, to the client device, the second composite token.

14. The method of claim 13, further comprising:
subsequent to transmitting the second composite token to the client device, receiving a second request to access the resource, the second request comprising the first composite token; and
responsive to receiving the second request comprising the first composite token subsequent to transmitting the second composite token:
invalidating the second composite token; and
requiring re-execution of the authentication process for access to the resource.

15. The method of claim 14, wherein the second composite token is invalidated further responsive to determining at least one of:
the first composite token is not a latest-generated composite token; and
the first composite token is not an active composite token.

16. The method of claim 14, wherein, further responsive to receiving the request comprising the first composite token subsequent to transmitting the second composite token:
transmitting a notification to the client device corresponding to unauthorized usage of the first composite token.

17. The method of claim 13, wherein the client device does not have functionality to extract the first access segment or the first regeneration segment from the first composite token.

18. The method of claim 13, wherein generating the first composite token comprises encrypting a combination of the first access segment and the first regeneration segment to deter access by the client device to (a) individual segments within the first composite token, (b) decipherable data stored in the first composite token, or (c) reverse engineer the first composite token.

19. The method of claim 13, wherein the first regeneration segment further has permissions to terminate permissions associated with the first regeneration segment and generate the second regeneration segment.

20. A system comprising:
one or more processors; and
memory storing instructions that, when executed by the one or more processors, cause the system to perform:
executing an authorization process that successfully authorizes a client device;
responsive to successfully authorizing the client device:
generating a first composite token comprising a first access segment and a first regeneration segment,
wherein the first access segment is associated with permissions to access a resource, and
wherein the first regeneration segment is associated with permissions to (a) terminate permissions associated with the first access segment and (b) generate a second access segment with permissions to access the resource;
transmitting the first composite token to the client device, wherein the client device obtains access to the resource by transmitting the first composite token to a server;
receiving (a) a first request to access the resource, and (b) the first composite token;
responsive to receiving the first composite token:
decomposing the first composite token to identify the first access segment and the first regeneration segment; and
determining that the first access segment has expired and the first regeneration segment has not expired;
responsive to determining that the first access segment has expired and the first regeneration segment has not expired:

granting access to the resource;

terminating permissions associated with the first composite token; and generating a second composite token comprising a second access segment and a second regeneration segment, wherein the second access segment is associated with permissions to access the resource, wherein the second regeneration segment is associated with permissions to (a) terminate permissions associated with the second access segment and (b) generate a third access segment with permissions to access the resource; and transmitting, to the client device, the second composite token.

* * * * *